Jan. 7, 1958 M. MALLORY 2,818,931
INTERNAL COMBUSTION ENGINE
Original Filed April 29, 1948 2 Sheets-Sheet 1
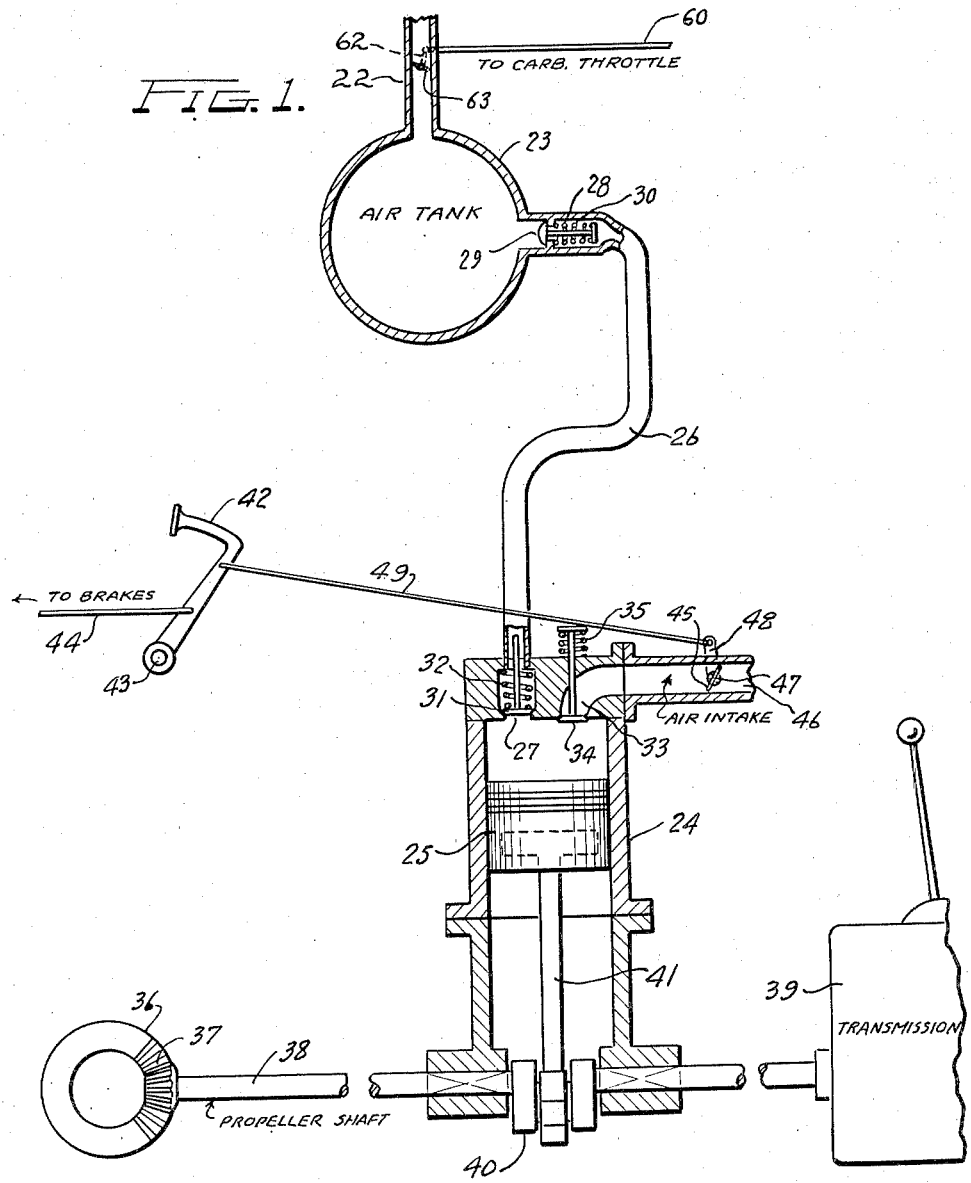
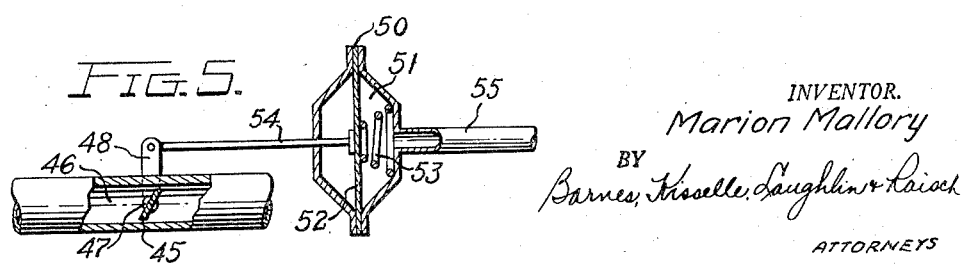
INVENTOR.
Marion Mallory
BY
Barnes, Kisselle, Laughlin & Raisch
ATTORNEYS

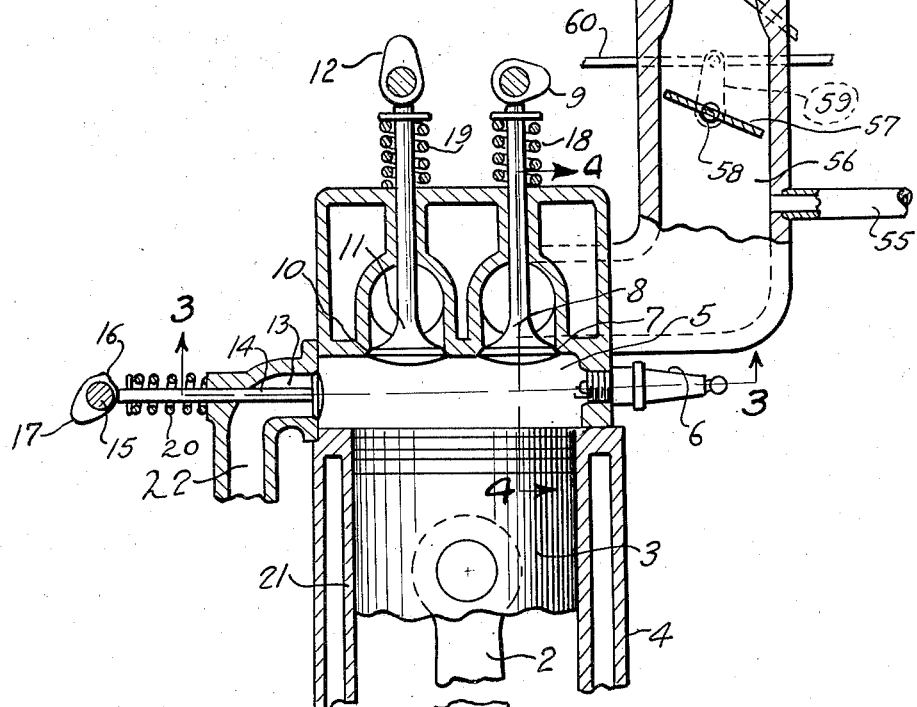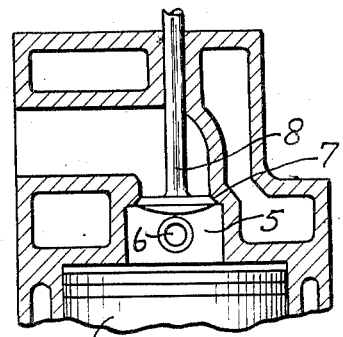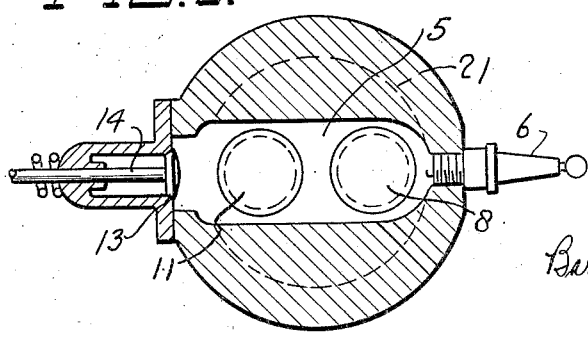

2,818,931

United States Patent Office
Patented Jan. 7, 1958

2,818,931
INTERNAL COMBUSTION ENGINE

Marion Mallory, Detroit, Mich.

Continuation of application Serial No. 23,958, April 29, 1948. This application March 19, 1956, Serial No. 572,599

5 Claims. (Cl. 180—54)

This invention relates to an internal combustion engine.

It is an object of this invention to produce an internal combustion engine which can be operated at extremely high compression and is therefore highly efficient.

In the ordinary engine detonation is the limiting factor to compression because the charge heats up so rapidly as soon as the piston starts to compress it that the charge becomes so hot it will pre-ignite and cause detonation. This pre-ignition and detonation is also provoked or accelerated by the hot exhaust valve and hot spark plugs. In my engine, I cool down the exhaust valve and locate the spark plug by the intake valve in a cooler zone and also cool down the compressed charge by injecting cool air into it near the end of the compression stroke.

Another advantage is that the mixtures normally taken into my engine are richer than the ordinary mixtures, and an overly rich mixture does not detonate or cause pre-ignition nearly so badly as a normal mixture. I then inject a cooler charge of air into the combustion chamber to dilute the rich mixture and bring it to normal. This makes possible the rapid burning of the mixture even after the piston has passed dead center. In other words, a rich mixture burns slowly and, if air is injected into it after the piston has slightly passed center, the burning of the mixture will speed up, giving most of the power on the downward stroke, in other words, greater leverage without bottling up the charge.

My invention also contemplates an arrangement for supplying compressed air to the engine wherein the compression of the air is effected by the inertia of the automotive vehicle so that power which is ordinarily wasted during deceleration of the vehicle is utilized for compressing the air preparatory to injecting the same into the engine.

Fig. 1 is a schematic view partly in section showing a portion of an automotive vehicle with the compressor mechanism, and Fig. 2 is a continuation of Fig. 1 showing my engine.

Fig. 3 is a section along the line 3—3 of Fig. 2.

Fig. 4 is a section along the line 4—4 of Fig. 2.

Fig. 5 shows a modified form of mechanism for controlling the supply of air to the compressor.

The elements of my engine are referenced as follows: crankshaft 1, connecting rod 2, piston 3, cylinder 4, combustion chamber 5, spark plug 6, fuel mixture intake port 7, intake valve 8, intake valve cam 9, exhaust port 10, exhaust valve 11, exhaust valve cam 12, compressed air port 13 controlled by valve 14, cam shaft 15, cams 16 and 17 for controlling valve 14, valve springs 18, 19, 20, cylinder 21 and conduit 22 connecting port 13 with tank 23 of compressed air, air pump 24 having reciprocating piston 25, conduit 26 connecting pump exhaust port 27 with inlet port 28 of tank 23, poppet valve 29 controlling port 28, compression spring 30 normally holding poppet valve 29 closed, poppet valve 31 for exhaust port 27, compression spring 32 normally holding valve 31 closed, intake port 33, poppet valve 34 controlling intake port 33, compression spring 35 normally holding valve 34 closed, ring gear 36 of the automotive vehicle differential, beveled gear 37 meshed with ring gear 36, propeller shaft 38, transmission 39 which is driven by the engine (Fig. 2), crank 40 on the propeller shaft 38, connecting rod 41 between piston 25 and crankshaft 40 for reciprocating piston 25. It is understood that the ring gear 36 and beveled gear 37 are a part of the differential which is built into the rear axle assembly of an automotive vehicle. Conventional brake pedal 42 pivoted as at 43 and connected to the brakes by link 44, butterfly throttle valve 45 for air intake passageway 46 pivoted on shaft 47, crank 48 on shaft 47, link 49 connecting brake pedal 42 with crank 48. As shown in Fig. 5, link 49 may be replaced by a suction device 50 comprising suction chamber 51, flexible diaphragm 52, compression spring 53, rod 54 connecting diaphragm 52 with crank 48, conduit 55 connecting suction member 51 into the intake passageway 56 on the engine side of carburetor throttle valve 57. Shaft 58 for carburetor throttle valve 57, crank 59 fixed on throttle shaft 58, link 60 connecting crank 59 with crank 62 which controls throttle valve 63 in conduit 22. Throttle valves 57 and 63 open and close in unison. The carburetor nozzle is designated 64.

If, as shown in Fig. 1, throttle valve 45 is operated off of the brake pedal, then valve 45 will open every time brake pedal 42 is depressed to apply the brakes. If air throttle valve 45 is operated by suction device 50, as shown in Fig. 5, it will be opened by intake passageway suction whenever carburetor throttle valve 57 is closed and when throttle valve 57 is open, the intake passageway pressure rises so that this higher pressure becomes established in chamber 51 and spring 53 will then act through link 54 to close valve 45.

The operation of my engine is as follows: As piston 3 moves downwardly a rich fuel-air mixture, preferably carburetted, is drawn in through port 7 by valve 8 which is open. Exhaust valve 11 and valve 14 are closed. After the piston is started back or upwardly on its compression stroke, then somewhere on the compression stroke cam 17 opens valve 14 and air under compression from tank 23 is forced through port 13 into the combustion chamber. Valves 8 and 11, of course, will be closed on the compression as well as power stroke of the engine. Valve 14 preferably closes when the piston is about 100° before dead center. The pressure of the charging air admitted through port 13 is less than the maximum compression pressures of the fuel-air mixture created by piston 3. Valve 14 preferably closes when the compression pressure and the air charging pressure are approximately balanced. Commingling of the air from port 13 and the fuel-air mixture in the combustion chamber decreases as the compression pressure rises and ceases as the air charging and compression pressures balance. This compressed air cools the combustion chamber more so at the end where port 13 is located than the end where spark plug 6 and intake valve 8 are located, and forces the fuel mixture back around the spark plug in the other end of the combustion chamber. The mixture will be richer and hotter in the end of the combustion chamber where ignition starts, that is, at spark plug 6, than at the opposite end of the combustion chamber. The richer mixture will be in and around the spark plug and the mixture will be gradually leaner toward the other end of the combustion chamber with the leanest mixture being present about valve 14. Ignition now takes place at or near the end of the compression stroke when the charge is in combustion chamber 5 above the cylinder. The rich mixture at spark plug 6 and intake valve 8 starts to burn and expands outwardly toward the other end of the combustion chamber burning in a smooth wave because the burning flame is moving toward a cooler part of the combustion chamber and the flame is also traveling in the direction towards which the mixture gets leaner. The flame finally is extinguished or dissipated in the air or exceedingly lean mixture at the end of the combustion chamber nearest port 13. Thus, in my engine the burning wave is slower even though high compression is used and thus the combustion pressures will be high even after the crankshaft has turned to its position where the combustion pressure can exercise maximum leverage. The compressed air charge through conduit 22 is throttled the same as the charge is throttled through the carburetor connected to intake port 7.

Small cam 16 is timed to momentarily open air valve 14 when the piston has reached the end of the exhaust stroke so that a small charge of compressed air flows through the combustion chamber and out through exhaust port 10 to clear out the burned gases. This additional gush of air through the combustion chamber caused by small cam 16 also cools exhaust valve 11. In my engine the overall ratio of the fuel mixture can be leaner than normal but a normal mixture ratio can be used and in such case a richer mixture than normal would enter the combustion chamber through intake port 7 and then be diluted by the compressed air charge from port 13.

Instead of admitting a carburetted charge through intake port 7 on the intake stroke of piston 3, air could be drawn into the combustion chamber through port 7 and fuel injected into the combustion chamber to commingle with said air preparatory to opening valve 14.

When the vehicle is being decelerated by applying the brake 42, throttle valve 45 is opened and pump 24 starts to pump air into air tank 23. Of course, when the vehicle is being decelerated, the carburetor throttle 57 and throttle 63 will be closed and pump 24 acts as a brake for the vehicle because, when decelerating, the propeller shaft 38 is driving a compressor pump. As soon as the brake is released and the carburetor throttle 57 and air valve throttle 63 open for acceleration, a highly compressed air charge will be admitted to the engine cylinder through conduit 22, as above described, which raises the compression and gives more power for acceleration. I have shown valve 45 connected to the brake pedal but it can be operated by suction device 50 because, when the carburetor throttle is closed during deceleration, the vacuum is high in the manifold and the suction device would open valve 45 permitting air pump 24 to draw in a charge of air and pump it into tank 23.

The compressed air which rushes into the cylinder through port 13 is directed against and around exhaust valve 11 which prevents detonation and spark plug 6, located close to the intake valve, also remains cool which prevents detonation. The air through port 13 can be injected into the cylinder any time after the piston is near or at top dead center or the air injection can even continue for a period after the explosion has taken place.

As long as the vehicle is running with the throttle open, if suction device 50 is used or with the brakes unapplied if link 49 is used, then valve 45 will be closed and no air will be drawn into the compressor on the down stroke of piston 25. Piston 25 on its down stroke will simply create a vacuum in the cylinder above it, which vacuum will draw the piston upwardly on its return stroke. Therefore, aside from the inertia of its moving parts, compressor 25 will not cause any power loss in the operation of the vehicle.

This application is a continuation of my copending application Serial No. 23,958, filed April 29, 1948, and since abandoned.

I claim:

1. In an automotive vehicle having an internal combustion engine for driving the same, an intake passageway for said combustion engine having a throttle valve controlling the flow of motive fluid through said engine, a compressor, a driving connection between said compressor and said vehicle for actuating said compressor, valve controlled air inlet and exhaust ports for said compressor, conduit means including a storage chamber connecting the exhaust port of the compressor with the combustion chamber of said engine, a throttle valve controlling the flow of compressed air from said storage chamber to the combustion chamber, means interconnecting said last mentioned throttle valve with the throttle valve in the intake passageway whereby the said valves open and close in unison, a valve controlling the supply of air to said compressor, and a valve actuator for said last mentioned valve, said compressor having an air intake passageway, said last mentioned valve controlling said compressor air intake passageway, said valve actuator comprising suction operated means connected into the motive fluid intake passageway on the engine side of the throttle valve therein for opening said valve in the compressor intake passageway whenever the motive fluid throttle valve is in closed position.

2. In an automotive vehicle having an internal combustion engine for driving the same, an intake passageway for said combustion engine having a throttle valve controlling the flow of motive fluid through said engine, a compressor, a driving connection between said compressor and said vehicle for actuating said compressor, valve controlled air inlet and exhaust ports for said compressor, conduit means including a storage chamber connecting the exhaust port of the compressor with the combustion chamber of said engine, valve means for controlling the flow of compressed air through said conduit from said storage chamber to the combustion chamber, means for opening and closing said valve means and said throttle valve in unison, a valve controlling the supply of air to said compressor, and a valve actuator for said last mentioned valve, said compressor having an air intake passageway, said last mentioned valve controlling said compressor air intake passageway, said valve actuator comprising suction operated means connected into the motive fluid intake passageway on the engine side of the throttle valve therein for opening said valve in the compressor intake passageway whenever the motive fluid throttle valve is in closed position.

3. In an automotive vehicle having an internal combustion engine for driving the same, an intake passageway for said combustion engine having a throttle valve controlling the flow of motive fluid through said engine, a compressor, a driving connection between said compressor and said vehicle for actuating said compressor, valve controlled air inlet and exhaust ports for said compressor, conduit means including a storage chamber connecting the exhaust port of the compressor with the combustion chamber of said engine, valve means for controlling the flow of compressed air through said conduit from said storage chamber to the combustion chamber, means for opening and closing said valve means and said throttle valve in unison, a valve controlling the supply of air to said compressor, and a valve actuator for said last mentioned valve, said compressor having an air intake passageway, said last mentioned valve controlling said compressor air intake passageway, said valve actuator comprising means for opening said valve in the compressor intake passageway whenever the motive fluid throttle valve is in closed position.

4. In an automotive vehicle having an internal combustion engine for driving the same, an intake passageway for said combustion engine having a throttle valve controlling the flow of motive fluid through said engine, a compressor, a driving connection between said compressor and said vehicle for actuating said compressor, valve controlled air inlet and exhaust ports for said compressor, conduit means including a storage chamber connecting the exhaust port of the compressor with the combustion chamber of said engine, valve means for controlling the flow of compressed air through said conduit from said storage chamber to the combustion chamber, means for opening and closing said valve means and said throttle valve in unison, a valve controlling the supply of air to said compressor, and a valve actuator for said last mentioned valve, said compressor having an air intake passageway, said last mentioned valve controlling said compressor air intake passageway, said valve actuator comprising means responsive to movement of said motive fluid throttle valve to closed position for opening said valve in the compressor intake passageway whereby said compressor is connected with a source of air whenever there is a drop in pressure in said motive fluid intake passageway on the engine side of the throttle valve therein.

5. In an automotive vehicle having an internal combustion engine for driving the same, an intake passageway for said combustion engine having a throttle valve controlling the flow of motive fluid through said engine, a compressor, a driving connection between said compressor and said vehicle for actuating said compressor, valve controlled air inlet and exhaust ports for said compressor, conduit means including a storage chamber connecting the exhaust port of the compressor with the combustion chamber of said engine, valve means for controlling the flow of compressed air through said conduit from said storage chamber to the combustion chamber, a valve controlling the supply of air to said compressor, and a valve actuator for said last mentioned valve, said compressor having an air intake passageway, said last mentioned valve controlling said compressor air intake passageway, said valve actuator comprising means responsive to movement of said motive fluid throttle valve to closed position for opening said valve in the compressor intake passageway whereby said compressor is connected with a source of air whenever there is a drop in pressure in said motive fluid intake passageway on the engine side of the throttle valve therein, said valve means controlling the flow of compressed air from said storage chamber to the combustion chamber comprising a throttle valve, means interconnecting said last mentioned throttle valve with the throttle valve in the motive fluid intake passageway whereby said valves open and close in unison.

No references cited.